(12) United States Patent
Sugawara

(10) Patent No.: US 6,580,241 B1
(45) Date of Patent: Jun. 17, 2003

(54) METHOD OF DETECTING PINCHING OF OBJECT IN POWER WINDOW DEVICE

(75) Inventor: Takehito Sugawara, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/696,454

(22) Filed: Oct. 25, 2000

(30) Foreign Application Priority Data

Nov. 1, 1999 (JP) .................................. 11-311238

(51) Int. Cl.$^7$ ................................................ H02P 1/04
(52) U.S. Cl. ..................... 318/443; 318/280; 318/281; 318/282; 318/283; 318/284; 318/285; 318/286; 318/434; 318/445; 318/456; 318/446
(58) Field of Search ............................. 318/280–286, 318/445, 446, 456, 432, 434, 443

(56) References Cited

U.S. PATENT DOCUMENTS

| | | | | |
|---|---|---|---|---|
| 4,581,711 A | | 4/1986 | Hirata et al. | |
| 5,162,711 A | * | 11/1992 | Heckler | 318/264 |
| 5,422,551 A | * | 6/1995 | Takeda et al. | 318/265 |
| 5,459,379 A | * | 10/1995 | Takeda et al. | 318/469 |
| 5,754,017 A | * | 5/1998 | Tsuge et al. | 318/286 |
| 5,832,664 A | * | 11/1998 | Tajima et al. | 49/26 |
| 5,977,732 A | * | 11/1999 | Matsumoto | 318/283 |
| 5,983,567 A | * | 11/1999 | Mitsuda | 49/26 |
| 6,034,495 A | | 3/2000 | Tamagawa et al. | |
| 6,037,727 A | * | 3/2000 | Kawanobe et al. | 318/286 |
| 6,164,015 A | * | 12/2000 | Kawanobe et al. | 49/360 |

FOREIGN PATENT DOCUMENTS

JP 11-62380 * 3/1999 .......... E05F/15/00

* cited by examiner

Primary Examiner—Robert E. Nappi
Assistant Examiner—Tyrone Smith
(74) Attorney, Agent, or Firm—Brinks Hofer Gilson & Lione

(57) ABSTRACT

In a power window device an MCU detects motor torque values one by one when a window is opened and closed, compares the detected motor torque values with base values set to the travel regions and stops or reverses a motor determining that an object is pinched in the window when the former values exceed the latter values.

4 Claims, 8 Drawing Sheets

FIG. 5

RATE OF CHANGE : $\alpha$ $\alpha 1$ = RATE OF CHANGE OF MOVING REGION N1

$\alpha 2$ = RATE OF CHANGE OF MOVING REGION N2

$\alpha 3$ = RATE OF CHANGE OF MOVING REGION N3

$\alpha 4$ = RATE OF CHANGE OF MOVING REGION N4

CORRECTED REFERENCE MEDIAN VALUE : B $B1 = A1 \times \alpha 1$ $B2 = A2 \times \alpha 2$ $B3 = A3 \times \alpha 3$ $B4 = A4 \times \alpha 4$ CORRECTION COEFFICIENT : $\beta$ $\beta 1 = 1.00$ $\beta 2 = (\beta 1 + \alpha 1) / 2$ $\beta 3 = (\beta 2 + \alpha 2) / 2$ $\beta 4 = (\beta 3 + \alpha 3) / 2$

CORRECTED REFERENCE VALUE : C $C1 = A1 \times \beta 1 + N$ $C2 = A2 \times \beta 2 + N$ $C3 = A3 \times \beta 3 + N$ $C4 = A4 \times \beta 4 + N$

METHOD OF DETECTING PINCHING OF OBJECT IN POWER WINDOW DEVICE

BACKGROUND OF THE INVENTION

1. Field of the Invention

The present invention relates to a method of detecting the pinching of an object in a power window device, and more particularly, to a method of detecting the pinching of an object in a power window device and for reducing a detection error which arises when a motor torque value is increased at a time it is detected whether an object, which is pinched in a window, is present or absent in each of a plurality of travel regions, which are obtained by dividing the entire moving range of the window, and by comparing a motor torque value with a corrected base value.

2. Description of the Related Art

Conventionally, in power window devices used to open and close a window of a vehicle, an object may be pinched in the window particularly when the window is being moved in a closing direction. When the object is pinched in the window, a large force is applied to the object by a drive force in a window closing direction, by which an excessive load is applied to a window open/close motor which provides the window with the drive force.

To avoid the occurrence of such an undesirable situation, there has been proposed a power window device provided with a means, which detects an object pinched in a window when the window is opened and closed and instantly stops or reverses the drive of a window open/close motor when it is detected that the object is pinched to thereby prevent an excessive load from being applied to the motor. That is, there has been proposed a power window device for detecting an object pinched in a window.

In this case, while there have been proposed various types of power window devices for detecting an object pinched therein, there is a power window device for detecting an object pinched therein as disclosed the applicant of in U.S. Pat. No. 6,034,495.

FIG. 6 is a block diagram showing the arrangement of the main portion of the power window device for detecting a pinched object according to the above referenced patent.

As shown in FIG. 6, the power window device includes a window open/close manual switch 71, a micro control unit (MCU) 72, a motor drive unit 73, a window open/close motor 74, and a pulse generator 75. In this case, the window open/close manual switch 71 includes a plurality of switches, for example, a window raising switch (UP) $71_1$, a window lowering switch (DOWN) $71_2$, and an auto switch (AUTO) $71_3$. The micro control unit (MCU) 72 includes a control/arithmetic operation unit $72_1$, a RAM $72_2$ and a pulse edge counter $72_3$.

The window raising switch $71_1$, the window lowering switch $71_2$, and the auto switch $71_3$ are connected to the input of the control/arithmetic operation unit $72_1$, the output of the control/arithmetic operation unit $72_1$ is connected to the input of the motor drive unit 73, and the output of the motor drive unit 73 is connected to the motor 74. The pulse generator 75 is directly coupled with the motor 74. The output of the pulse generator 75 is connected to the input of the pulse edge counter $72_3$, and the output of the pulse edge counter $72_3$ is connected to the control/arithmetic operation unit $72_1$. The RAM $72_2$ and the control/arithmetic operation unit $72_1$ are connected to each other.

Further, FIG. 7 is a characteristic view showing an example of the base median values and the base values of the motor torque set to the respective travel regions of a window when the entire travel region thereof is divided into 36 travel regions in the power window device shown in FIG. 6, and FIG. 8 is a characteristic view showing an example of the corrected base values set to a part of the travel region in the power window device shown in FIG. 6.

In FIG. 7, an abscissa represents the number of arrival pieces of pulse edge interval data which are obtained by counting a piece of pulse edge interval data each time it arrives, and an ordinate represents motor torque. In the figure, M represents a motor torque value, A represents a base median value, K represents a base value, H represents a motor torque value when an object is pinched a moment after a window starts movement.

As shown in FIG. 7, the proposed power window device mentioned above is arranged such that 36 travel regions are formed by equally dividing the entire travel extent of the window, that is, the window movable region from a window full-open position to a window full-close position, and various types of values for determining the presence and absence of an object pinched in the window, that is, a base median value, a corrected base median value, a base value and a corrected base value are set to each of the travel regions as described below. In this case, the 36 regions are formed by generating 2-phase pulses from the pulse generator 75 when the motor 74 is in rotation, detecting the respective pulse edge intervals of the 2-phase pulses by the pulse edge counter $72_3$ which counts clock signals and using the thus detected count values.

The outline of the operation of the power window device for detecting an object pinched therein shown in FIG. 6 will be described here using FIGS. 7 and 8 in combination.

When any switch of the window open/close manual switch 71 is manually operated, the micro control unit 72 outputs a drive signal corresponding to the manually operated switch to the motor drive unit 73 in response to the manual operation of the switch. The motor drive unit 73 supplies a motor drive signal to the motor 74 in response to the drive signal supplied thereto, rotates the motor 74 in one direction or the other direction in correspondence to the manually operated switch and causes the window coupled with the motor 74 to move in a window opening or closing direction by the rotation of the motor 74. The rotation of the motor causes the pulse generator 75 directly coupled with the motor 74 to be operated, by which 2-phase pulses each having a cycle corresponding to the rotation of the motor 74 are output from the pulse generator 75 and supplied to the edge counter $72_3$. In this case, each of the 2-phase pulses is a square wave pulse having a 90° phase difference and one cycle of which corresponds to one rotation of the motor 74. The pulse edge counter $72_3$ detects timing at which each pulse edge of the supplied 2-phase pulses arrives and calculates an interval from a time at which one pulse arrives to a time at which a next pulse arrives by counting clock signals, and the control/arithmetic operation unit $72_1$ detects a motor torque value based on the calculated count value.

In this case, the RAM $72_2$ is provided with a base median value storing area, a base tolerance value storing area, a motor torque data addition value storing area, a start cancel storing area, the number of motor torque data in travel region storing area, the total number of motor torque data storing area, and the like. Then, the control/arithmetic operation unit $72_1$ calculates the base median value A (for example, A0 to A4) of motor torque, the corrected base median value B (for example, B0 to B4) representing the average of motor torque values, the base value K (for example, K1 to K4) which is obtained by adding a given allowable base value to the base median value A (for example, A0 to A4), a correction coefficient (for example, α0 to α3) for correcting the base value K (for example, K1 to K4), and the corrected base value C (for example, C1 to C4), based on various kinds of data stored in these storing areas as shown in FIG. 8.

The example shown in FIG. 8 is a case in which the motor 74 is started when the window is located in a travel region N0 and the window is sequentially moved thereby from the travel region N0 in the directions of a travel region N1, a travel region N2, a travel region N3, and a travel region N4. A rate of change α1 represents the ratio (B0/A0) of the corrected base median value B0 obtained in the first travel region N0 to the base median value A0 set to the travel region N0; a rate of change α2 represents the ratio (B1/A1) of the corrected base median value B1 obtained in the next travel region N1 to the base median value A1 set to the travel region N1; a rate of change α3 represents the ratio (B2/A2) of the corrected base median value B2 obtained in the next travel region N2 to the base median value A2 set to the travel region N2; and a rate of change α4 represents the ratio (B3/A3) of the corrected base median value B3 obtained in the next travel region N3 to the base median value A3 set to the travel region N3. When it is supposed that the base value is represented by K, the corrected base value C1 of the travel region N1 is K1×α0 which is obtained by multiplying the rate of change α1 obtained in the travel region N0 by the base value K1 (A1+K) set to the travel region N1. In the same way, the corrected base value C2 of the travel region N2 is K2×α1 (K2 is the base value set to the travel region N2); the corrected base value C3 of the travel region N3 is K3×α2 (K3 is the base value set to the travel region N3); and the corrected base value C4 of the travel region N4 is K4×α3 (K4 is the base value set to the travel region N4).

The control/arithmetic operation unit $72_1$ detects the motor torque values M when the window moves in the respective travel regions N1 to N4, compares the detected motor torque values M with the corrected base values C1 to C4 set to the travel regions N1 to N4. When the motor torque values exceed the corrected base values C1 to C4, the control/arithmetic operation unit $72_1$ determines that an object is pinched in the window, instantly stops or reverses the drive of the motor 74 through the motor drive unit to thereby prevent the object pinched in the window from being damaged as well as prevent an excessive load from being applied to the motor 74.

The power window device according to the above proposal for detecting an object pinched therein sets the corrected base values, which are obtained by multiplying the base values K1 to K4 by the rates of change α1 to α3, to the travel regions N1 to N4, respectively, compares the motor torque values M detected in the respective travel regions N1 to N4 with the corrected base values C1 to C4 corresponding thereto and determines that the object is pinched in the window when the motor torque values M exceed the corrected base values C1 to C4. Accordingly, the proposed power window device can determine the presence or absence of the occurrence of an object pinched in the window in a state which can be adapted to the change of the motor torque values M when the window travels as compared with other conventionally known power window devices which determine that an object is pinched in a window when detected motor torque values M exceed base values K1 to K4 which correspond thereto in the comparison therebetween.

However, in the proposed power window device for detecting a pinched object, the corrected base values C1 to C4 set to the respective travel regions N1 to N4 are set to given values in the respective travel regions N1 to N4. Thus, when a motor torque value M is considerably greatly changed in a travel region, in particular, when an object is pinched in the window and when the window arrives a full-open position or a full-close position and a load applied to the window open/close motor 74 is greatly changed, there is caused a large dispersion in the result of comparison between a certain part and other part in the respective travel regions N1 to N4 when the detected motor torque values M are compared with the corrected base values C1 to C4 which are set to the given values in the respective travel regions N1 to N4. As a result, it is difficult to detect an object pinched in the window in a state in which the change of the motor torque values M is correctly followed, that is, it is difficult to greatly improve the detecting accuracy.

SUMMARY OF THE INVENTION

Accordingly, an object of the present invention, which was made in view of the above technical background, is to provide a method of detecting pinching of an object in a power window device capable of detecting the occurrence of an object pinched in a window with high detecting accuracy by changing corrected base values set in respective travel regions therein.

To achieve the above object, in a method of detecting pinching of an object in a power window device according to the present invention in which the entire travel region of the window is divided into a plurality of travel regions, a base median value, a base tolerance value, and a base value obtained by adding the base median value and the base tolerance value are set to each of the travel regions, the micro control unit includes means for finding a corrected base median value, which represents the average of the detected motor torque values, for finding a rate of change by dividing the found corrected base median value by a corresponding base median value, for calculating a correction coefficient based on the found rate of change, for finding a corrected base value by multiplying the calculated correction coefficient by the corresponding base value, for utilizing the found corrected base value as the corrected base value of the middle point of a corresponding travel region as well as for setting a corrected base line by connecting the corrected base values of the middle points of adjacent travel regions by a straight line, and for determining the presence or absence of the object pinched in the window by comparing the corrected base line with the detected motor torque value in each travel region.

As a preferred example in the above means, the corrected base value in the method of detecting pinching of an object in the power window device of the present invention is calculated by the average of the correction coefficient and the rate of change found in an immediately preceding travel region.

As a specific example in the means, the corrected base value in the method of detecting pinching of an object in the power window device of the present invention is found only when the rate of change of a corresponding travel region exceeds a prescribed value, and 1±0.15 is preferably selected as the prescribed value.

According to these means, when the corrected base value is to be set for each of the travel regions, the base median value set for each travel region is multiplied by the correction coefficient set for each travel region, the corrected base value is found by adding the base tolerance value to the multiplied value, and the found corrected base value is set as the corrected base value of the middle point of each travel region as well as a corrected base line is set by connecting the corrected base value of the middle point of each travel region to the corrected base values set to the middle points of adjacent travel regions. Then, when the window sequentially travels in the respective travel regions, the corrected base line set in a travel region is utilized as a corrected base value to be compared with the motor torque value detected in the travel region. Accordingly, the corrected base values set to the respective travel regions do not have a given value but they are set to change along the corrected base line, which permits the corrected base values to be set in accordance with the change of the motor torque values in the respective travel regions. As a result, the occurrence of an object pinched in the window can be detected with high accuracy.

BRIEF DESCRIPTION OF THE DRAWINGS

FIG. 5 is a characteristic view showing the relationship among a correction coefficient, the base median value, the corrected base median value, the base tolerance value, and the corrected base value set for each of the travel regions in the power window device shown in FIG. 1;

DESCRIPTION OF THE PREFERRED EMBODIMENTS

An embodiment of the present invention will be described below with reference to drawings.

Figure 1:
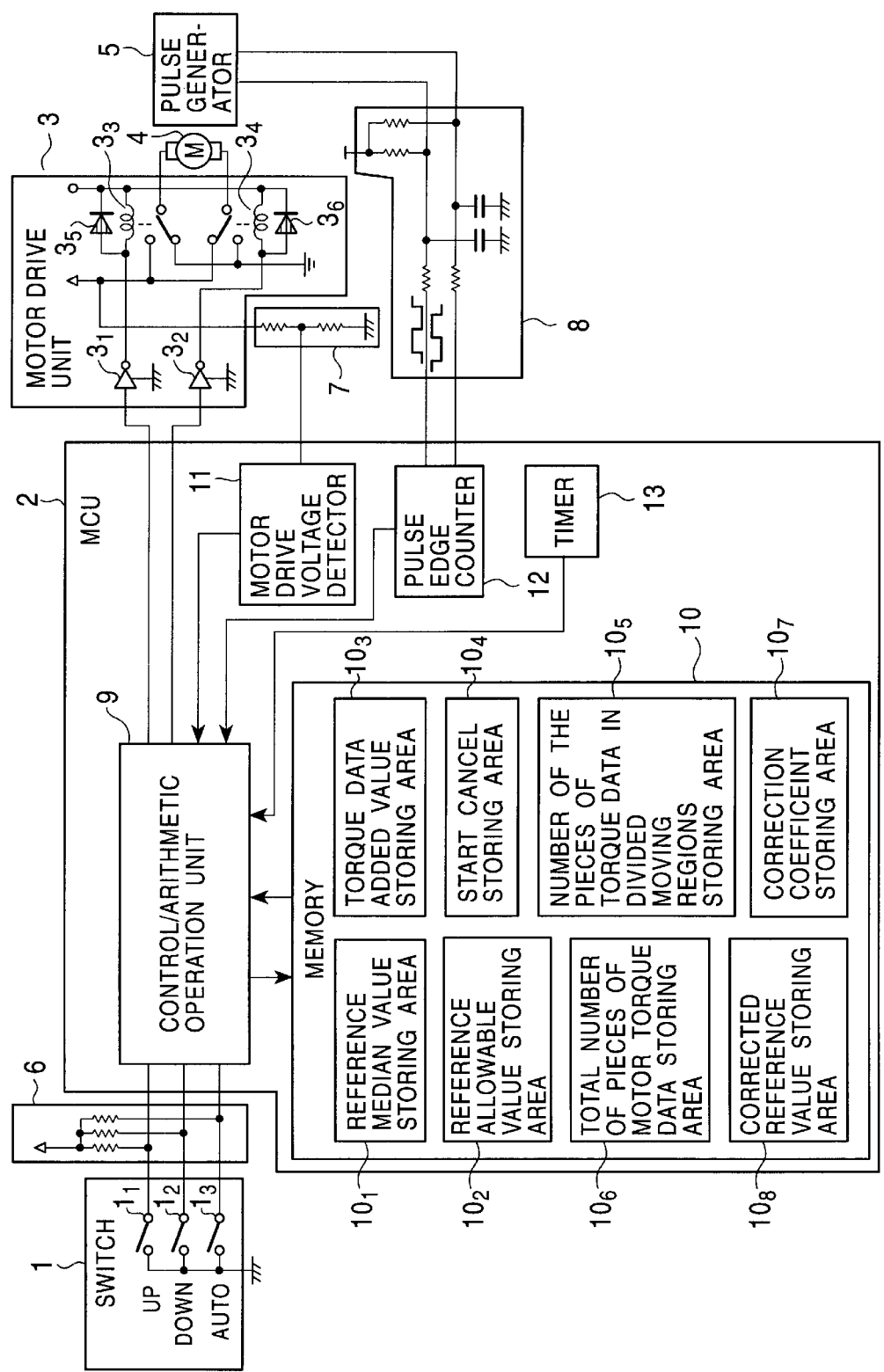
FIG. 1 is a block diagram showing the arrangement of the main portion of a power window device according to the present invention used to embody a method of detecting pinching of an object in the power window device.

FIG. 1 is a block diagram showing the arrangement of the main portion of a power window device according to the present invention used to embody a method of detecting pinching of an object in the power window device.

As shown in FIG. 1, the power window device includes a window open/close manual switch 1, a micro control unit (MCU) 2, a motor drive unit 3, a window open/close motor (M) 4, a pulse generator 5, a pull-up resistance circuit 6, a voltage-dividing resistor circuit 7, and a pulse transmission path 8.

window open/close manual switch 1 includes a plurality of switches which are individually manually operated, for example, a window raising switch (UP) $1_1$, a window lowering switch (DOWN) $1_2$ and an auto switch (AUTO) $1_3$. The window raising switch $1_1$ instructs to move a window upward (close), whereas the window lowering switch $1_2$ instructs to move the window downward (open). The window is moved in a designated direction only when one of the switches $1_1$ and $1_2$ is operated when the manual operation of the switches $1_1$ and $1_2$ is stopped, the movement of the window also is stopped. The auto switch $1_3$ instructs the automatic continuation of the operation. When the auto switch $1_3$ and the window raising switch $1_1$ are simultaneously operated, while the window begins to start an upward (close) movement, the upward (close) movement thereof is continued even if the operations of the auto switch $1_3$ and the window raising switch $1_1$ are stopped thereafter and the window is stopped when it reaches the uppermost portion (full-close position) of a window frame. Further, when the auto switch $1_3$ and the window lowering switch $1_2$ are simultaneously operated, while the window begins a downward (open) movement likewise, the downward (open) movement of the window is continued even if the operations of the auto switch $1_3$ and the window lowering switch $1_2$ are stopped thereafter and the window is stopped when it reaches the lowermost portion (full-open position) of the window frame.

The micro control unit 2 includes a control/arithmetic operation unit 9, a RAM (memory) 10, a motor drive voltage detector 11, a pulse edge counter 12, and a timer 13. In this case, the control/arithmetic operation unit 9 generates a control signal corresponding to an operated state of the window open/close manual switch 1, and supplies the control signal to the motor 4 through the motor drive unit 3 to thereby rotate the motor 4 in correspondence to the operation of the switch 1. At the same time, the control/arithmetic operation unit 9 performs predetermined data processing, data arithmetic operation and the like based on the data supplied from the motor drive voltage detector 11 and the pulse edge counter 12 and on the data stored in the RAM 10 and controls the rotating state of the motor 4 through the motor drive unit 3. The RAM 10 includes 8 storing areas composed of a base median value storing area $10_1$, a base tolerance value storing area $10_2$, a torque data addition value storing area $10_3$, a start cancel storing area $10_4$, the number of torque data in divided travel regions storing area $10_5$, the total number of motor torque data storing area $10_6$, a correction coefficient storing area $10_7$ and a corrected base value storing area $10_8$. Note that the contents stored in these 8 storing areas will be described later. The motor drive voltage detector 11 detects a divided voltage representing a vehicle-mounted power supply (battery) voltage obtained at the voltage dividing point of the voltage-dividing resistor circuit 7. The pulse edge counter 12 detects the respective pulse edges of the 2-phase pulses supplied from the pulse generator 5.

The motor drive unit 3 includes two inverters $3_1$ and $3_2$ for inverting the control signal, two relays $3_3$ and $3_4$ for switching the rotation of the motor 4 to any of forward rotation, backward rotation and stop, and two diodes $3_5$ and $3_6$ for preventing the occurrence of a spark and rotates the motor 4 in response to a state of the control signal supplied from the micro control unit 2.

The motor 4 is coupled with a window of a vehicle through a window drive mechanism whose rotating shaft is not illustrated. When the motor 4 rotates, for example, when it rotates in one (forward) direction, the window is closed thereby, whereas when the motor 4 rotates in the other (reverse) direction, the window is opened thereby.

The pulse generator 5, which is directly attached to the motor 4, is mounted on the rotation shaft of the motor 4 and has the two Hall elements disposed to generate two-phase pulses having a phase difference of 90° when the motor 4 rotates. When the motor 4 rotates, the two Hall elements generate two-phase pulses having a deviation of a ¼ cycle. One cycle of the pulse is obtained when the motor 4 rotates once.

The pull-up resistance circuit 6 is composed of three resistors connected in parallel between the output of the window open/close manual switch 1 and input of the micro control unit 2 and the power supply and supplies a power supply voltage (for example, 5 V) to the input of the macro control unit 2 when the respective switches $1_1$, $1_2$ and $1_3$ are not operated.

The voltage-dividing resistor circuit 7 is composed of two resistors connected in series between the vehicle-mounted power supply (battery) and the ground, and the contacts of these resistors are connected to the motor drive voltage detector 11 of the micro control unit 2.

The pulse transmission path 8 is composed of two pull-up resistors connected between the output of the pulse generator 5 and the power supply, a capacitor connected between the output of the pulse generator 5 and the ground, and two resistors connected in series between the output of the pulse generator 5 and the input of the pulse edge counter 12 and transmits the 2-phase pulses output from the pulse generator 5 to the pulse edge counter 12.

When the motor 4 rotates and the window is opened and closed thereby, the 2-phase pulses generated from the pulse generator 5 are supplied to the pulse edge counter 12 through the pulse transmission path 8. The pulse edge counter 12 detects the respective pulse edges (rising up and falling down) of each of the 2-phase pulses and supplies an edge detection signal to the control/arithmetic operation unit 9 each time a pulse edge is detected. The control/arithmetic operation unit 9 finds timing, at which the edge detection signal is supplied, by means of the timer 13 which counts clock signals, and an interval of arrival between one edge detection signal and a subsequent edge detection signal (which is hereinafter referred to as an edge interval data) is measured by the number of counts. Note that one piece of the edge interval data is obtained each time the motor 4 makes ¼ rotation.

Incidentally, the power window device shown in FIG. 1 utilizes the motor torque value of the motor 4 for opening and closing the window as a parameter to be used when an object pinched in the window is detected, and the motor torque value is found by the calculation performed using the edge interval data and the like. Note that the motor torque value also includes the weight of the window, a friction force between the window and the window frame, and the like.

Figure 7:
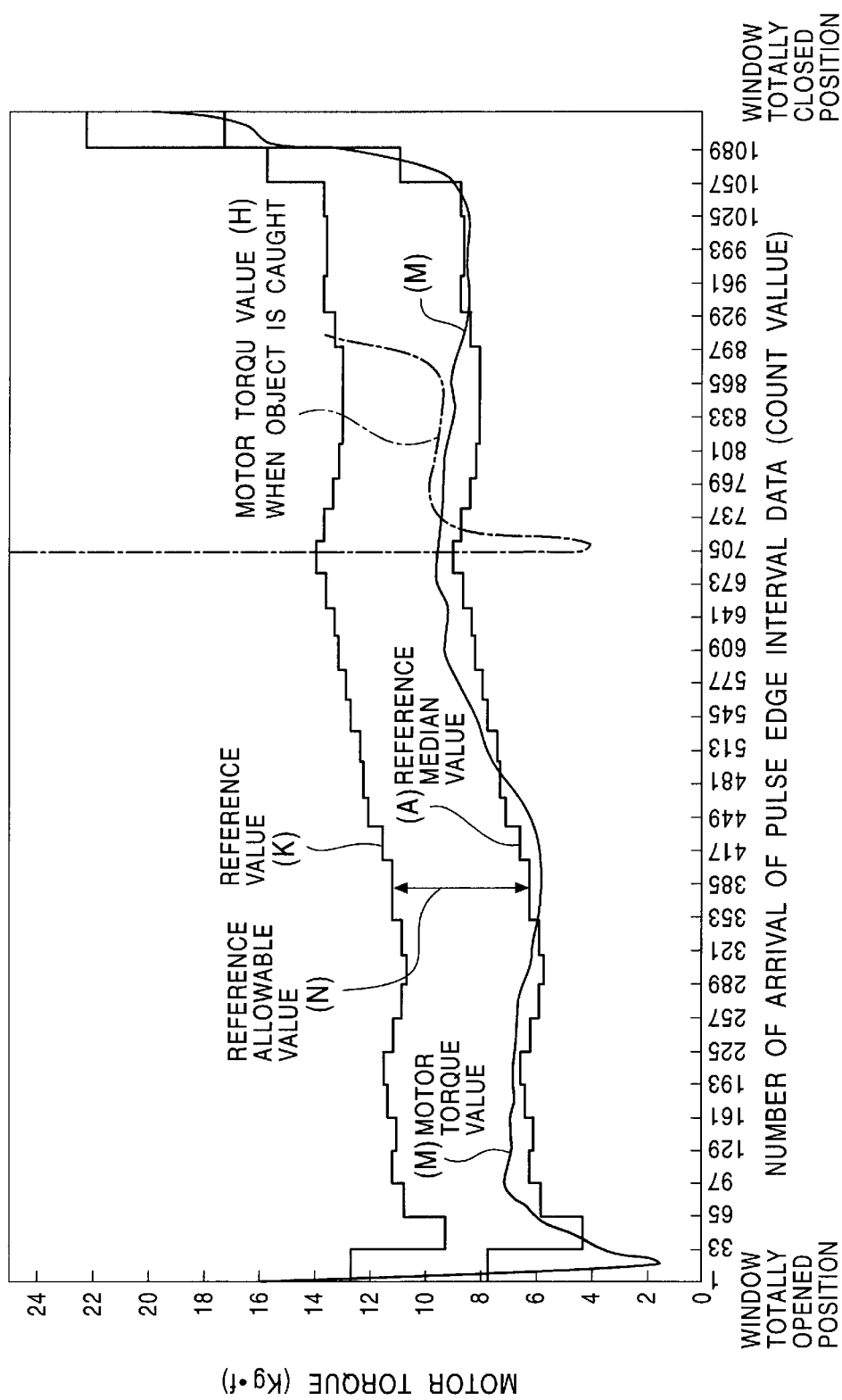
FIG. 7 is a characteristic view showing an example of the base median values and the base values of the motor torque set to the respective travel regions of a window when the entire travel region thereof is divided into 36 travel regions in the power window device shown in FIG. 6.
Figure 8:
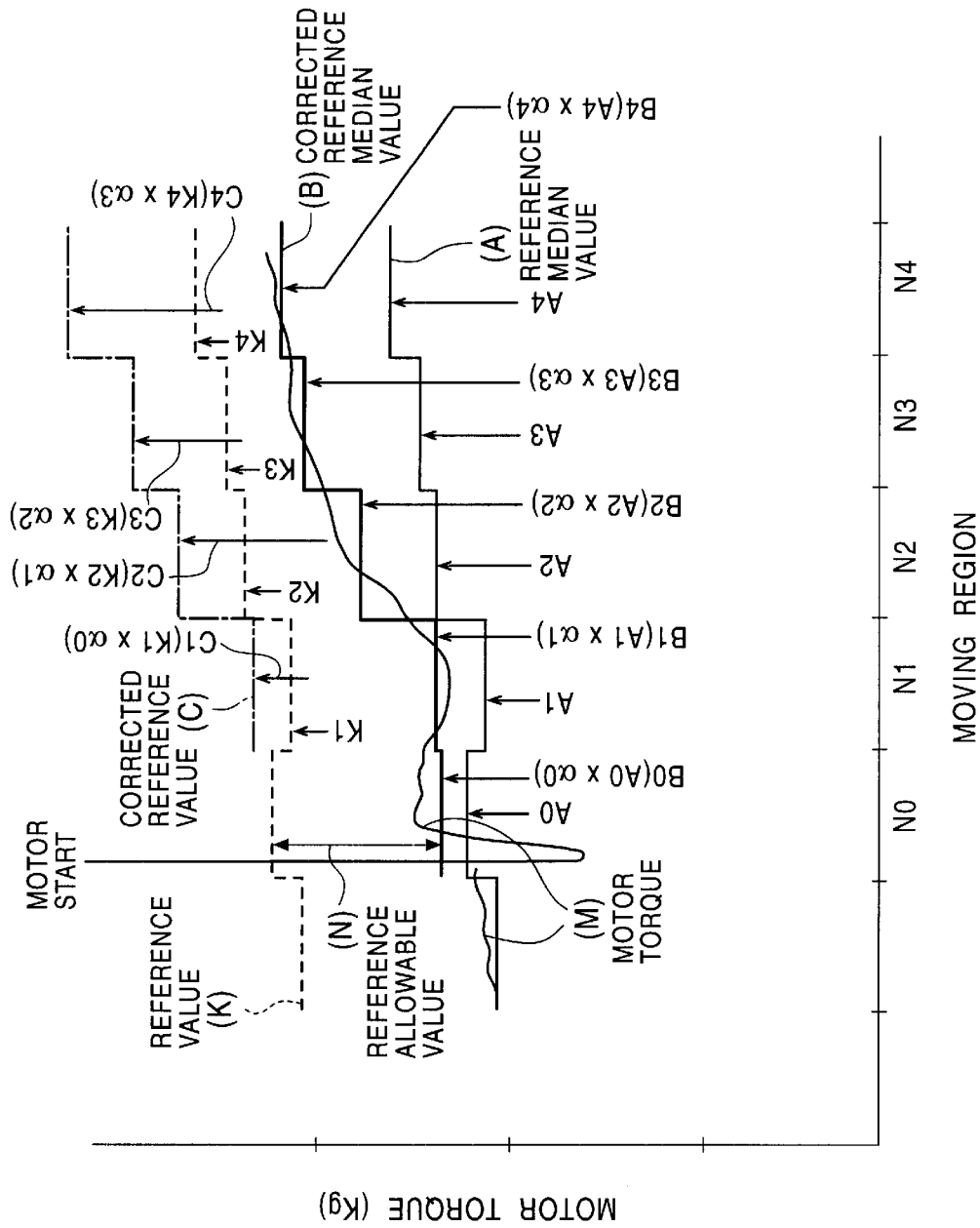
FIG. 8 is a characteristic view showing an example of the corrected base values set to a part of the travel region in the power window device shown in FIG. 6.

Further, travel regions are set to the power window device shown in FIG. 1 which are obtained by equally dividing the entire travel extent of the window (the effective travel region between the full-open position and the full-close position) into, for example, 36 sections based on the number of counts which are counted each time edge interval data arrives similarly to the known power window device proposed above for detecting a pinched object, that is, as shown in FIG. 7. Then, the base median value A, the corrected base median value B, the base tolerance value N, the base value K and the corrected base value C are set for each of the 36 travel regions.

Figure 4:
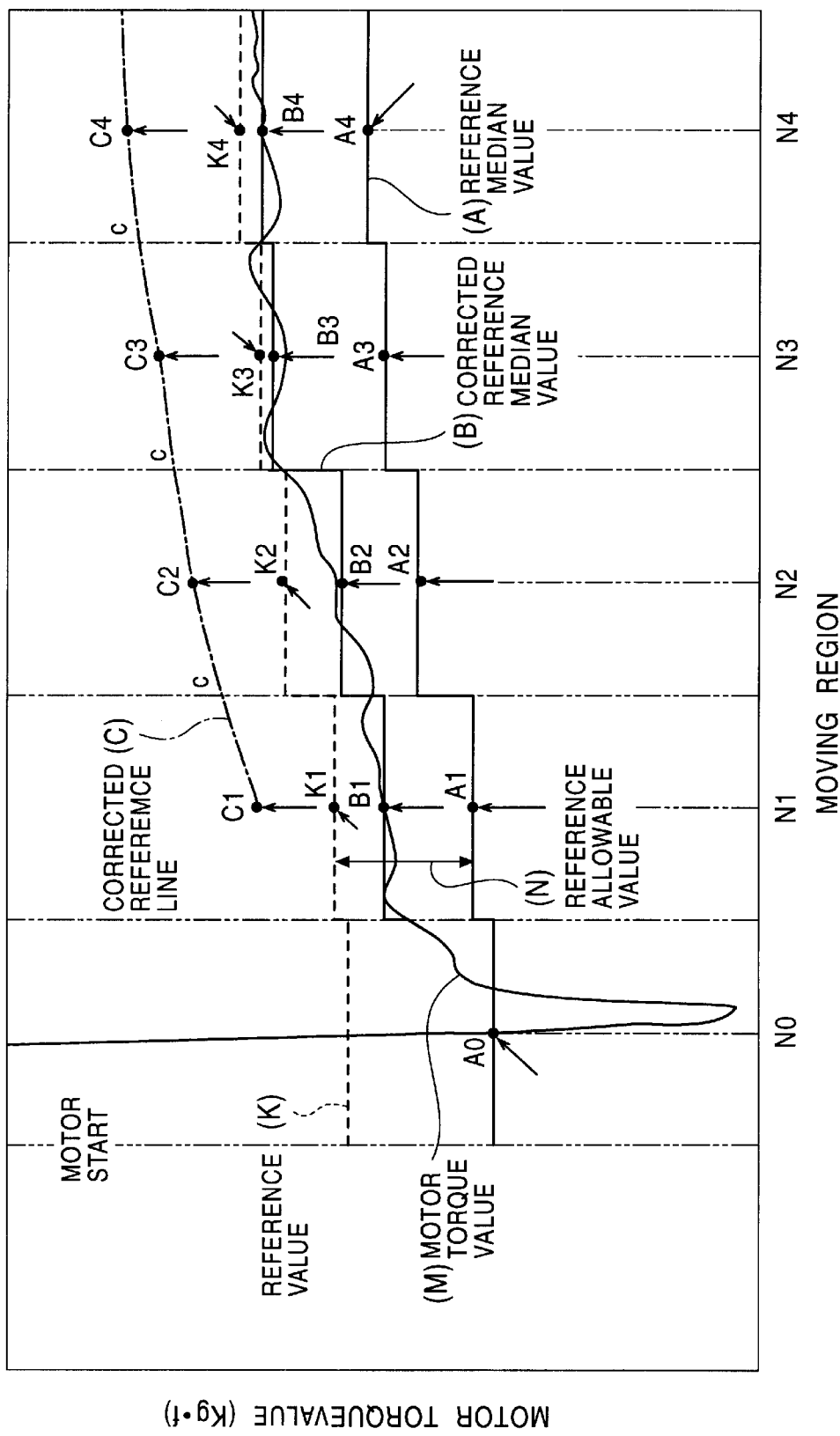
FIG. 4 is a characteristic view showing the relationship among a base median value, a corrected base median value, a base tolerance value, a base value and a corrected base value set for each of the travel regions in the power window device shown in FIG. 1.
Figure 6:
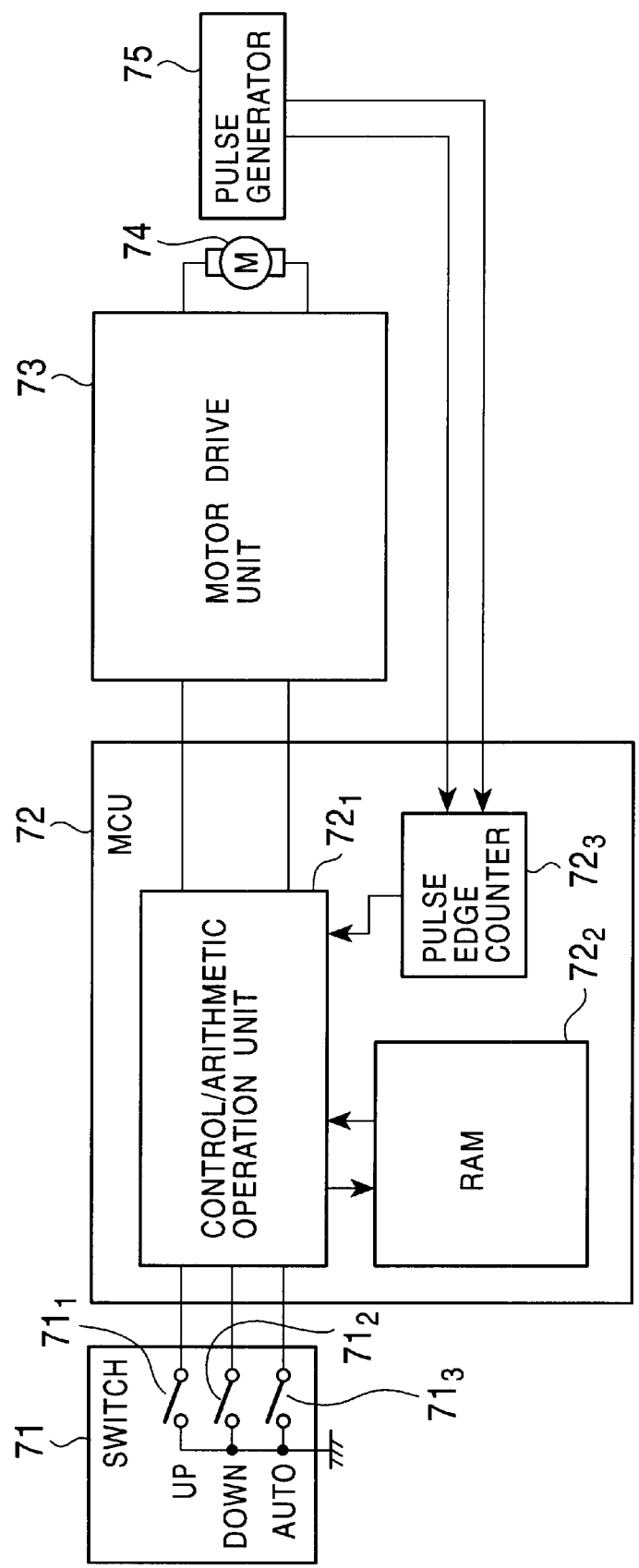
FIG. 6 is a block diagram showing a conventional arrangement of the main portion of a power window device for detecting a pinched object.

FIG. 4 is a characteristic view showing the relationship among the base median value A, the corrected base median value B, the base tolerance value N, the base value K and the corrected base value C set for each of the travel regions in the power window device shown in FIG. 1, and FIG. 5 is a view showing the relationship among the correction coefficient β, the base median value A, the corrected base median value B, the base tolerance value N, and the corrected base value C set for each of the travel regions in the power window device shown in FIG. 1.

In this case, the travel regions to be described are limited to 4 regions, that is, to travel regions N1 to N4 in FIGS. 4 and 5 to simplify explanation. Note that the numerals postfixed to the characters A, B, C, α, and β are shown in correspondence to the travel regions N1 to N4.

As shown in FIG. 5, to find the correction coefficients β1 to β4 of the respective travel regions N1 to N4, first, the corrected base median values B1 to B4 are divided by the base median values A1 to A4 as to each of the travel regions N1 to N4, thereby obtaining rates of change α1 to α4. That is, the rate of change α1 of the travel region N1 is obtained by B1/A1; the rate of change α2 of the travel region N2 is obtained by B2/A2; the rate of change α3 of the travel region N3 is obtained by B3/A3; and the rate of change α4 of the travel region N4 is obtained by B4/A4. Next, the correction coefficients β1 to β4 are found from the averages of the correction coefficients β1 to β3 and the rates of change α1 to α3, which are obtained in the immediately preceding travel regions, using the obtained rates of change α1 to α4. That is, the correction coefficient β1 of the travel region N1 is set to 1 because the correction coefficient β0 of the immediately preceding travel region N0 is not obtained. The correction coefficient β2 of the travel region N2 is found from {(β1+α1)/2}; the correction coefficient β3 of the travel region N3 is found from {(β2+α2)/2}; and the correction coefficient β4 of the travel region N4 is found from {(β3+α3)/2}. The obtained correction coefficients β1 to β4 are stored in the correction coefficient storing area $10_7$ of the RAM 10.

Then, a correction coefficient β2 is used when a window travels in the travel region N2 based on the obtained correction coefficients β1 to β4, the corrected base value C1 set for the travel region N1, is calculated by A1×β2+N; the corrected base value C2 set for the travel region N2 is calculated by A2×β2+N; the corrected base value C3 set for the travel region N3 is calculated by A3×β2+N, respectively, and the calculated corrected base values C1 to C3 are stored in the corrected base value storing area $10_8$ of the RAM 10.

Incidentally, the base median values A1 to A4 are motor torque values which are necessary to move the window in each of the travel regions N1 to N4 when no object is substantially pinched in the window and measured when no object is pinched, and the measured motor torque values are stored in the base median value storing area $10_1$ of the RAM 10. The base median values A1 to A4, which has been set to the respective travel regions, are renewed to new base median values each time the window moves to at least one travel region.

In this case, the motor torque values are obtained by calculating a predetermined equation using the edge interval data, a motor drive voltage and other inherent data. Among them, one piece of the edge interval data is obtained each time the motor 4 makes ¼ rotation, which means that when the window travels in the effective travel region between the full-open position and the full-close position, that is, when it travels in all the 36 travel regions, 32 pieces of the pulse edge interval data, for example, are obtained in each travel region, and thus about 1200 pieces of the pulse edge interval data are obtained in the entire travel regions and motor torque values as many as the about 1200 pieces of the pulse edge interval data are obtained based on the pulse edge interval data.

The corrected base median value B shows the average of the motor torque values in each of the travel regions N1 to N4 and can be obtained by dividing the total motor torque values in each of the travel regions N1 to N4 by the number of the edge interval data in each of the travel regions N1 to N4.

The base tolerance value N is usually a given value having no relation to the respective travel regions N1 to N4 and ordinarily found based on the specification and the like of the window. Specifically, used as the base tolerance value N is a converted value obtained by converting a maximum allowable force applicable to an object into a motor torque value when the object is pinched in the window or a value obtained by adding any correction to the converted value.

The base values K1 to K4 are obtained by adding the base tolerance value N, which is the given value, to the base median values A1 for A4 set to the respective travel regions N1 to N4 and serve as base values for determining the presence or absence of pinching of an object in the respective travel regions N1 to N4.

The corrected base values C1 to C4 are values used in place of the base values K1 to K4 and obtained by multiplying the base median values A1 to A4 set for the respective travel regions N1 to N4 by the correction coefficients β1 to β4 and adding the base tolerance value N to the obtained multiplied values. The corrected base values C1 to C4 in the power window device are not shown as given values in the respective travel regions N1 to N4. That is, the corrected base values C1 to C4, which are set in the respective travel regions N1 to N4, are used as the corrected base values C1 to C4 at the middle points of the respective travel regions N1 to N4, and the corrected base values C in the respective travel regions N1 to N4 at the points thereof other than the middle points are set on a corrected base line obtained by connecting the corrected base values C1 to C4 of the middle points of the adjacent travel regions N1–N2, N2–N3, and N3–N4.

The operation of the power window device shown in FIG. 1 will be described here.

First, the operation of the power window device when the window open/close switch 1 is operated will be described. When one of the switches in the window open/close switch 1, for example, the window raising switch $1_1$ is operated, the contact of the switch is closed and the input of the micro control unit 2 connected to the window raising switch $1_1$ changes from the power supply voltage 5 V to the ground voltage. The control/arithmetic operation unit 9 of the micro control unit 2 supplies a control signal for rotating the motor 4 in a forward direction to the motor drive unit 3 in response to the ground voltage input to the macro control unit 2, and the motor drive unit 3 switches the two relays $3_3$ and $3_4$ in response to the control signal to thereby rotate the motor 4 in the forward direction. When the motor 4 is rotated in the forward direction, the window is moved in a closing direction through the window drive mechanism coupled with the motor 4. Further, the rotation of the motor 4 causes the pulse generator 5 mounted thereon to generate 2-phase pulses which are supplied to the pulse edge counter 12 of the micro control unit 2 through the pulse transmission path 8.

When the operation of the window raising switch $1_1$ is stopped, the contact thereof is opened, which causes the input of the micro control unit 2 connected to the window raising switch $1_1$ to change from the ground voltage to the power supply voltage 5 V. The control/arithmetic operation unit 9 supplies a control signal for stopping the rotation of the motor 4 to the motor drive unit 3 in response to the voltage of 5 V input thereto, the motor drive unit 3 switches the two relays $3_3$ and $3_4$ in response to the control signal and stops the supply of power to the motor 4 to thereby stop the motor 4. When the rotation of the motor 4 is stopped, the operation of the window drive mechanism coupled with the motor 4 is stopped and the movement of the window is stopped at a position at that time. Further, when the rotation of the motor 4 is stopped, the pulse generator 5 also stops the generation of the 2-phase pulses and no 2-phase pulse is supplied to the pulse edge counter 12.

Further, when other switch in the window open/close switch 1, for example, the window lowering switch $1_2$ is operated, the input of the micro control unit 2 connected to the window lowering switch $1_2$ is changed to the ground voltage similarly to the above-mentioned case. The control/arithmetic operation unit 9 of the micro control unit 2 supplies a control signal for rotating the motor 4 in a backward direction to the motor drive unit 3 in response to the ground voltage input to the macro control unit 2, and the motor drive unit 3 switches the two relays $3_3$ and $3_4$ in response to the control signal and rotates the motor 4 in the backward direction. When the motor 4 is rotated in the backward direction, the window is moved in an open direction through the window drive mechanism coupled with the motor 4. Also in this case, when the motor 4 is rotated, the pulse generator 5 generates 2-phase pulses which are supplied to the pulse edge counter 12 through the pulse transmission path 8.

Thereafter, when the operation of the window lowering switch $1_2$ is stopped, the input of the micro control unit 2 connected to the window lowering switch $1_2$ changes from the ground voltage to 5 V. The control/arithmetic operation unit 9 supplies a control signal for stopping the rotation of the motor 4 to the motor drive unit 3 in response to the voltage of 5 V input to the macro control unit 2, the motor drive unit 3 switches the two relays $3_3$ and $3_4$ in response to the control signal and stops the supply of power to the motor 4 to thereby stop the motor 4. When the rotation of the motor 4 is stopped, the operation of the window drive mechanism coupled with the motor 4 is stopped and the movement of the window is stopped at a position at that time. Further, when the rotation of the motor 4 is stopped, the pulse generator 5 also stops the generation of the 2-phase pulses and no 2-phase pulse is supplied to the pulse edge counter 12.

Further, when the window raising switch $1_1$ and the auto switch $1_3$ in the window open/close switch 1 are simultaneously operated or when the window lowering switch $1_2$ and the auto switch $1_3$ are simultaneously operated, approximately the same operations as the above-mentioned operations will be performed or operations according to the above-mentioned respective operations will be performed.

Figure 2:
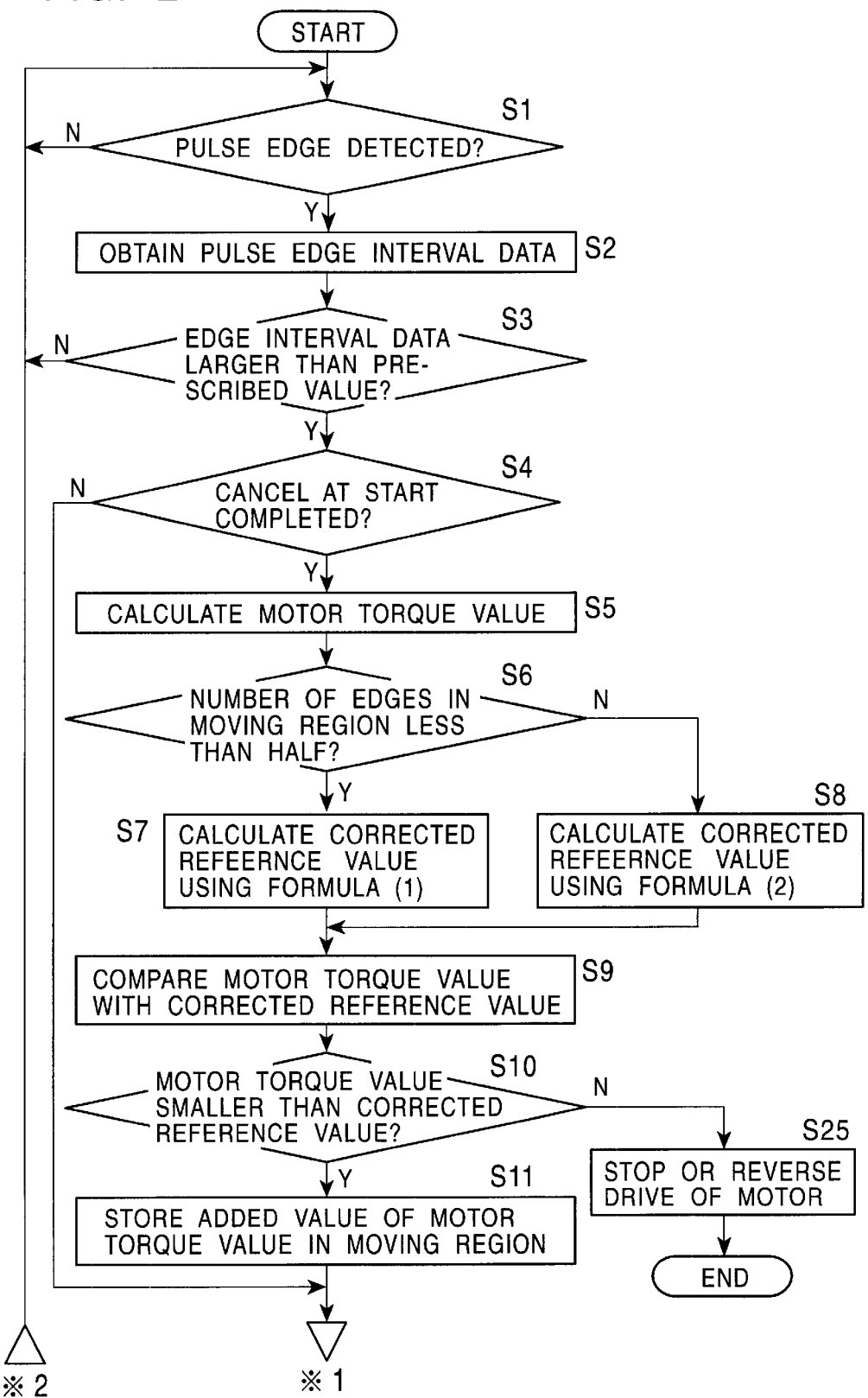
FIG. 2 is a part of a flowchart showing the flow of a detailed operation including detection of the pinching of an object in the window at the operating time of the power window apparatus shown in FIG. 1.
Figure 3:
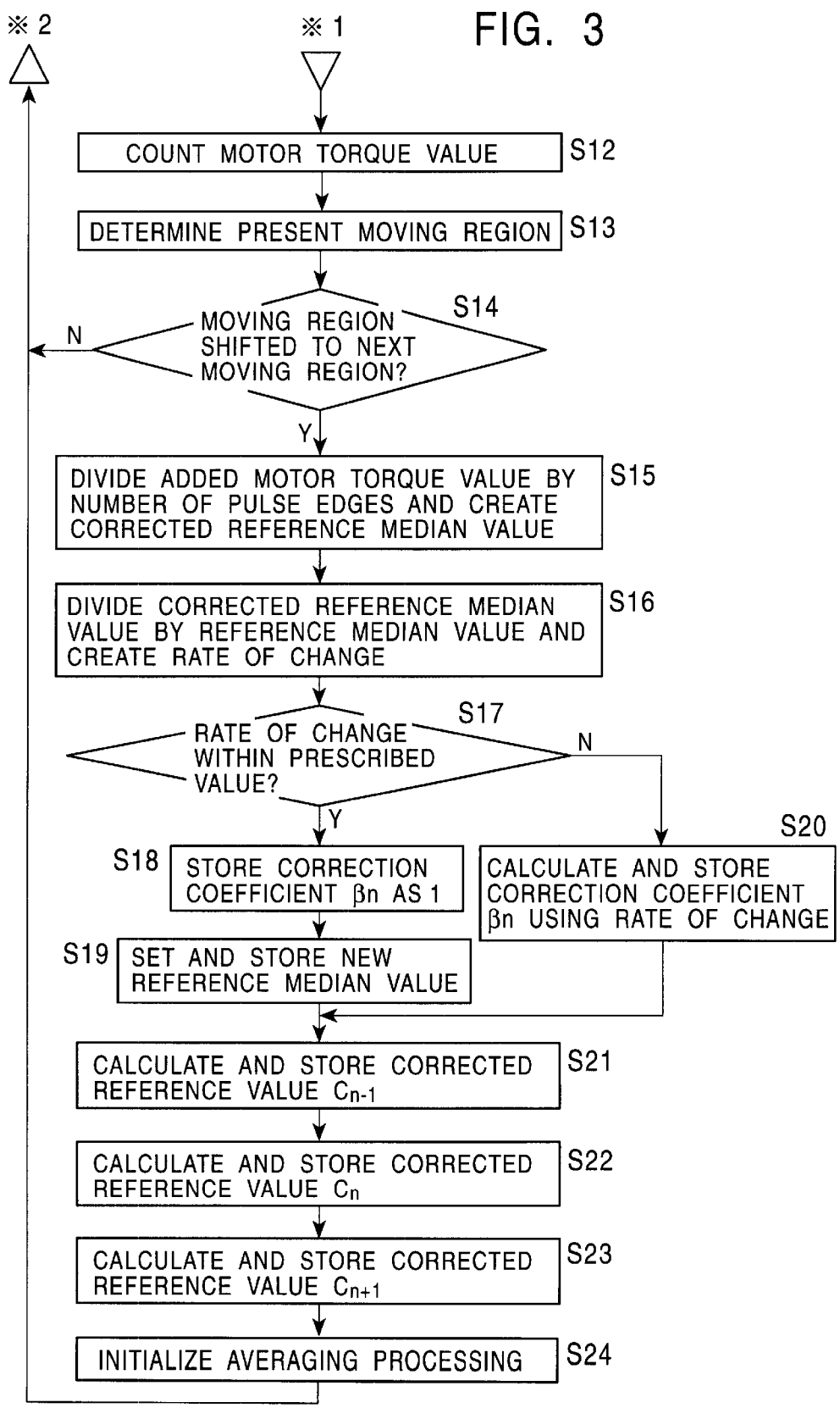
FIG. 3 is the remaining part of the flowchart showing the flow of the detailed operation including the detection of pinching of an object in the window at the operating time of the power window apparatus shown in FIG. 1.

Next, FIGS. 2 and 3 are flowcharts showing in detail how the power window device shown in FIG. 1 is operated including the detection of an object pinched in the window when the above-mentioned operations are performed in the power window device.

How the power window device shown in FIG. 1 is operated will be described in detail using the flowcharts shown in FIGS. 2 and 3.

First, at step S1, the control/arithmetic operation unit 9 determines whether or not the pulse edge counter 12 has detected the pulse edges of the 2-phase pulses supplied from the pulse generator 5. When the control/arithmetic operation unit 9 determines that the pulse edges have been detected (Y), the process goes to next step S2, whereas when the control/arithmetic operation unit 9 determines that the pulse edges have not been yet detected (N), step S1 is executed repeatedly.

Next, at step S2, when the pulse edge counter 12 detects the pulse edges, the control/arithmetic operation unit 9 obtains edge interval data which represents a time interval between a time at which a pulse edge was detected last time and a time at which a pulse edge is detected this time from the count value of the timer 13.

Next, at step S3, the control/arithmetic operation unit 9 determines whether or not the obtained edge interval data satisfies at least a prescribed value (for example, 3.5 msec), that is, the control/arithmetic operation unit 9 determines whether it is regular edge interval data or noise. When it is determined that the edge interval data satisfies at least the prescribed value (Y), the process goes to next step S4, whereas when it is determined that the edge interval data does not satisfy the prescribed value and that it is noise (N), the process returns to initial step S1 and repeats steps S1 and the subsequent steps.

At subsequent step S4, the control/arithmetic operation unit 9 determines whether or not a transient operation at the start of the motor 4 has been completed, that is, whether or not cancel at start has been completed. Then, when it is determined that the transient operation at the start has been completed (Y), the process goes to next step S5, whereas when it is determined that the transient operation at the start has not been yet completed (N), the process goes to step S12.

A reason why it is determined here whether or not the transient operation at the start of the motor 4 has been completed is to avoid the occurrence of the following problem. That is, if the presence or absence of an object pinched in the window is determined at the start of the motor 4, at which the internal torque of the motor 4 changes from a maximum state to a steady state, based on a motor torque value measured at that time, it is erroneously determined that the object is pinched in the window because a large amount of motor torque is measured. Another reason is to prevent new base median values A1 to A4 from being set to values which do not reflect an actual state in the renewal of the base median values A1 to A4, which have been set, by the use of the large amount of motor torque.

In this case, whether or not the transient operation at the start of the motor 4 has been completed is determined by determining whether or not the transient operation is within a period of time during which pulse edges are detected the predetermined number of times from the time at which an initial pulse edge is detected. When the transient operation of the motor 4 is not yet completed, it is stored in the start cancel storing area $10_4$ of the RAM 10.

Subsequently, at step S5, the control/arithmetic operation unit 9 calculates the motor torque M by the following formula using a motor drive voltage E obtained by the motor drive voltage detector 11 through the voltage-dividing resistor circuit 7, edge interval data Pw, and other inherent data.

[Formula 1]

$$M = \left\{\left(kt \cdot \frac{E}{Rm}\right) - Tm\right\} - \frac{ke \cdot kt}{Rm \cdot Pw}$$

where,

M: motor torque
E: motor drive voltage
kt: motor torque coefficient
Rm: motor winding resistance
ke: motor generation coefficient
Pw: edge interval data
Tm: motor internal torque Next, at step S6, the control/arithmetic operation unit 9 determines whether or not the travel position of the window at that time is located in the first half portion of the travel region based on the edge interval data Pw. Then, when it is determined that the travel position of the window is located in the first half portion of the travel region (Y), the process goes to next step S7, whereas when it is determined that the travel position of the window is not located in the first half portion of the travel region but located in the second half portion thereof (N), the process goes to other step S8.

A reason why it is determined whether the travel position of the window is located in the first half portion of the travel region or in the second half portion thereof is to derive a corrected base line c, when the travel position is located in the first half portion of the travel region, using a corrected base value $C_n$ set to the travel region $N_n$ and a corrected base value $C_{n-1}$ set to an immediately preceding travel region $N_{n-1}$ and, on the other hand, to derive a corrected base line c, when the travel position is located in the second half portion of the travel region, using the corrected base value $C_n$ set to the travel region $N_n$ and a corrected base value $C_{n+1}$ set to an immediately succeeding travel region $N_{n+1}$.

Next, at step S7, the control/arithmetic operation unit 9 calculates the corrected base line (value) c using the following formula (a) because the travel position of the window is located in the first half portion of the travel region $N_n$.

[Formula 2]

$$C = \left\{\frac{(C_n - C_{n-1})}{Pw - CNT}\right\} \times X + \left\{\frac{Pw - CNT}{2}\right\} + C_{n-1} \quad \text{where,} \quad (1)$$

C: corrected base line (value)
X: position in travel region (the number of pulse edges)

Pw−CNT: number of all the pulse edges in travel region

In this case, a reason why the value of half the entire pulse edges Pw−CNT in the travel region $N_n$ is added to the position X in the travel region $N_n$ is that the corrected base values $C_n$ and $C_{n-1}$, which are set at the middle points of the adjacent travel regions $N_n$ and $N_{n-1}$, are connected to each other by a straight line.

Further, at step S8, the control/arithmetic operation unit 9 calculates the corrected base line (value) c using the following formula (2) because the travel position of the window is located in the second half portion of the travel regions $N_n$.

[Formula 3]

$$C = \left\{\frac{(C_{n+1} - C_n)}{Pw - CNT}\right\} \times \left\{X - \frac{Pw - CNT}{2}\right\} + C_n \quad (2)$$

In this case, a reason why the value of half the entire pulse edges Pw−CNT in the travel region $N_n$ is subtracted from the position X in the travel region $N_n$ is that the corrected base values $C_n$ and $C_{n+1}$, which are set at the middle points of the adjacent travel regions $N_n$ and $N_{n+1}$, are connected to each other by a straight line.

At subsequent step S9, the control/arithmetic operation unit 9 compares the motor torque value detected in the travel region $N_n$, in which the window travels, with the corrected base line (value) c set to the travel region $N_n$.

Subsequently, at step S10, the control/arithmetic operation unit 9 determines whether or not the motor torque value is smaller than the corrected base line (value) c as the result of the comparison at step S9. Then, when it is determined that the motor torque value is smaller than the corrected base line (value) c (Y), the process goes to next step S11, whereas when it is determined that the motor torque value exceeds the corrected base line (value) c (N), the process goes to other step S25.

Next, at step S11, the control/arithmetic operation unit 9 sequentially stores the detected motor torque values in the torque data addition value storing area $10_3$ of the RAM 10 to add all the motor torque values detected in the travel region $N_n$ in which the window travels and stores them as torque data addition values.

Next, at step S12, the control/arithmetic operation unit 9 adds "1" to the number of torque data in travel region, which are stored in the number of torque data in travel region storing area $10_5$ of the RAM 10 and stores it to count the number of motor torque detected in the travel region $N_n$ in which the window travels.

At subsequent step S13, the control/arithmetic operation unit 9 determines the present travel region of the window based on the number of total pieces of torque data stored in the number of pieces of total torque data storing area $10_6$.

Subsequently, at step S14, the control/arithmetic operation unit 9 determines whether or not the present travel region $N_n$ of the window has been traveled to a next travel region $N_{n+1}$ based on the determination at step S13. When it is determined that the window has traveled to the next travel region $N_{n+1}$ (Y), the process goes to next step S15, whereas when it is determined that the window has not yet traveled to the next travel region $N_{n+1}$ (N), the process returns to initial step S1 and step S1 and subsequent steps are repeated.

Subsequently, at step S15, the control/arithmetic operation unit 9 divides the added motor torque value stored in the torque data addition value storing area $10_3$ of the macro control unit 2 by the number of torque data in travel region stored in the number of torque data in divided travel region storing area $10_5$ to thereby find the corrected base median value $B_{n-1}$ which represents the average of the motor torque in the travel region, for example, $N_{n-1}$ in the window travelled immediately.

Next, at step S16, the control/arithmetic operation unit 9 divides the corrected base median value $B_{n-1}$ found at step S15 by the base median value $A_{n-1}$ set to the travel region $N_{n-1}$ in which the window travels at present, thereby calculating the rate of change an in the travel region $N_{n-1}$. The calculated rate of change $\alpha_{n-1}$ is stored in the correction coefficient storing area $10_7$ of the RAM 10.

Next, at step S17, the control/arithmetic operation unit 9 determines whether or not the rate of change $\alpha_{n-1}$ found at step S16 is within the range of a prescribed value, for example, within the range of 1±0.15. Then, when it is determined that the rate of change $\alpha_{n-1}$ is within the range of the prescribed value (Y), the process goes to next step S18, whereas when the rate of change $\alpha_{n-1}$ is not within the range of the prescribed value (N), the process goes to other step S20.

At subsequent step S18, the control/arithmetic operation unit 9 stores 1 in the correction coefficient storing area $10_7$ of the RAM 10 as a correction coefficient. In this case, the correction coefficient βn is set to 1 so as not to change the corrected base value Cn set to the travel region because the rate of change $\alpha_{n-1}$ is within the range of 1±0.15.

Subsequently, at step S19, the control/arithmetic operation unit 9 sets a new base median value $A_{n-1}$ to an immediately preceding travel region, for example, $N_{n-1}$ based on the motor torque value obtained in the immediately preceding travel region $N_{n-1}$. The new base median value $A_{n-1}$ is stored in place of the previous base median value $A_{n-1}$ stored in the base median value storing area $10_1$ of the RAM 10.

Further, at step S20, the control/arithmetic operation unit 9 calculates the correction coefficient $\beta_n$ using $\{(\beta_{n-1}+\alpha_{n-1})/2\}$ because the rate of change $\alpha_{n-1}$ exceeds the range of 1±0.15.

Next, at step S21, the control/arithmetic operation unit 9 calculates the corrected base values $C_{n-1}$ set to the immediately preceding travel region $N_{n-1}$ using the following formula (3) and stores the calculated base value $C_{n-1}$ in the corrected base value storing area $10_8$ of the RAM 10. Note that in the following formula (3), N represents the allowable base value.

$$C_{n-1}=A_{n-1}\times\beta_n+N \qquad (3)$$

Next, at step S22, the control/arithmetic operation unit 9 calculates the corrected base values $C_n$ set to the travel region $N_n$ using the following formula (4) and sets the calculated corrected base values $C_n$ to the corrected base value storing area $10_8$ of the RAM 10.

$$C_n=A_n\times\beta_n+N \qquad (4)$$

At subsequent step S23, the control/arithmetic operation unit 9 calculates the corrected base values $C_{n+1}$ set to the travel region $N_{n+1}$ using the following formula (5) and sets the calculated corrected base values $C_{n+1}$ to the corrected base value storing area $10_8$ of the RAM 10.

$$C_{n+1}=A_{n+1}\times\beta_n+N \qquad (5)$$

Subsequently, at step S24, the control/arithmetic operation unit 9 initializes the torque data addition value storing area $10_3$ and the number of torque data in divided travel region storing area $10_5$ of the RAM 10 to find the average of the motor torque values. After the initialization, the process returns to initial step S1 and the operations at step 1 and subsequent steps are repeated.

The repeated operations of the flowchart are performed until the drive of the motor 4 is stopped by ending the operation of the window raising switch $1_1$, the operation of the window lowering switch $1_2$ or the like or until an object pinched in the window is detected at step S25, which will be described later, and the motor 4 is stopped thereby so as to stop the movement of the window or the motor 4 is rotated thereby in the backward direction so as to move the window in the backward direction.

Further, at step S25, the control/arithmetic operation unit 9 determines that an object is pinched because the motor torque value has exceeded the corrected base line (value) c, supplies a control signal to the motor drive unit 3, switches the two relays $3_3$ and $3_4$ and stops the movement of the window by stopping the rotation of the motor 4 or moves the window in the backward direction by rotating the motor 4 in the backward direction, thereby protecting the object pinched in the window from being damaged.

As described above, according to the method of detecting pinching of an object in the power window device shown in FIG. 1, the corrected base line (value) c, which is set for each travel region, is arranged to locate on a straight line which connects the middle point of adjacent travel regions. Accordingly, a corrected base value is set in accordance with the change of the motor torque value in each travel region, which permits the occurrence of an object pinched in the window to be detected with high accuracy.

Further, in the embodiment, when the rate of change is small, specifically, when it is within 1±0.15, the correction coefficient is set to 1. However, the numerical value 1±0.15 is not restrictive and it is needless to say that other numerical value may be selected.

Furthermore, while the 2-phase pulse generator using the Hall elements is used to obtain the edge interval data Pw in the embodiment, the present invention is not limited thereto, and it is needless to say that any other pulse generator may be used so long as it is a pulse generator capable of obtaining the edge interval data Pw in synchronism with the rotation of a motor such as a one-phase pulse generator, a mechanical pulse generator and the like.

As described above, according to the present invention, when the corrected base value is set for each of the travel regions, the base median value set for each travel region is multiplied by the correction coefficient set for each travel region, the corrected base value is found by adding the base tolerance value to the multiplied value, and the found corrected base value is set as the corrected base value of the middle point of each travel region as well as the corrected base line, which connects the corrected base value of the middle point of each travel region to the corrected base values set to the middle points of adjacent travel regions, is set. Then, when the window sequentially travels in the respective travel regions, the corrected base line set to a travel region in which the window travels is utilized as the corrected base value to be compared with the motor torque value detected in the travel region. Accordingly, the corrected base values in the respective travel regions are not set to a given value but they are set to change along the corrected base line, which permits the corrected base values to be set in accordance with the change of the motor torque values in the respective travel regions. As a result, there can be obtained an advantage that the occurrence of an object pinched in the window can be detected with high accuracy.

What is claimed is:

1. A method of detecting pinching of an object in a power window device having a motor to open and close a window, a motor drive unit to drive the motor, a pulse generator to generate a pulse as the motor rotates, a memory, a micro control unit to control respective units, and a window open/close manual switch, the method comprising:

dividing a travel extent of the window into a plurality of travel regions;

detecting motor torque values in sequence when opening or closing the window under control of the micro control unit, for each travel region: determining a base median value representing a motor torque value when no pinching occurs, a base tolerance value which is a tolerance value of increased motor torque value caused by pinching, adding the base median value and the base tolerance value to calculate a base value, and storing the base value in the memory;

calculating a corrected base median value by averaging motor torque values detected in an immediately preceding travel region, calculating a rate of change by dividing the corrected base median value by a corresponding base median value in the immediately preceding travel region, calculating a correction coefficient in a present travel region from a first equation that includes the rate of change, calculating a corrected base value in a middle point of the present travel region by applying the correction coefficient in a second equation, and connecting corrected base values at the middle points of adjacent travel regions by a straight line and setting corrected base line values other than at the middle point of the particular travel regions;

comparing the motor torque value detected after setting the corrected base value with corrected base value; and determining that pinching exists when the motor torque value exceeds the corrected base value and stopping the motor or rotating the motor in a reverse direction in response to determining that pinching exists.

2. A method of detecting pinching of an object in a power window device according to claim 1, further comprising calculating said correction coefficient in the present travel region by averaging the correction coefficient and the rate of change found in the immediately preceding travel region only if the rate of change exceeds a predetermined value, and if the rate of change does not exceed the predetermined value, setting the rate of change to 1.

3. A method of detecting pinching of an object in a power window device according to claim 2, further comprising selecting a value of 1±0.15 as said prescribed value.

4. A method of detecting pinching of an object in a power window device according to claim 1, further comprising:

calculating a corrected base value at the middle point in the present travel region, the corrected base value at the middle point in the immediately preceding travel region, and a corrected base value at the middle point in an immediately succeeding travel region using the correction coefficient in the present travel region; and setting a corrected base line value other than at the middle points by connecting the corrected base values at said middle points by a straight line.

* * * * *